United States Patent [19]

MacDonald et al.

[11] Patent Number: 5,179,499
[45] Date of Patent: Jan. 12, 1993

[54] MULTI-DIMENSIONAL PRECISION MICRO-ACTUATOR

[75] Inventors: Noel C. MacDonald; Jun J. Yao, both of Ithaca, N.Y.

[73] Assignee: Cornell Research Foundation, Inc., Ithaca, N.Y.

[21] Appl. No.: 868,102

[22] Filed: Apr. 14, 1992

[51] Int. Cl.⁵ .................................. H01L 21/306
[52] U.S. Cl. .............................. 361/313; 156/630
[58] Field of Search .................. 156/628, 630; 361/311–313; 340/870.37

[56] References Cited

U.S. PATENT DOCUMENTS

| | | | |
|---|---|---|---|
| 2,975,307 | 3/1961 | Schroeder et al. | 310/6 |
| 3,835,338 | 10/1974 | Martin | 310/8.6 |
| 4,381,672 | 5/1983 | O'Connor et al. | 73/505 |
| 4,520,570 | 6/1985 | Bednorz et al. | 33/180 R |
| 4,668,865 | 5/1987 | Gimzewski et al. | 250/306 |
| 4,764,244 | 8/1988 | Chitty et al. | 156/630 |
| 4,831,614 | 5/1989 | Duerig et al. | 369/101 |
| 4,841,191 | 6/1989 | Takata et al. | 310/317 |
| 4,987,303 | 1/1991 | Takase et al. | 250/306 |
| 5,043,577 | 8/1991 | Pohl et al. | 250/306 |
| 5,055,838 | 10/1991 | Wise et al. | 340/870.37 |

Primary Examiner—Donald Griffin
Attorney, Agent, or Firm—Jones, Tullar & Cooper

[57] ABSTRACT

Mechanically movable microstructure fabricated from a single crystal such as silicon and actuator structures for providing a high degree of controlled, precision motion of nanometer-scale.

38 Claims, 6 Drawing Sheets

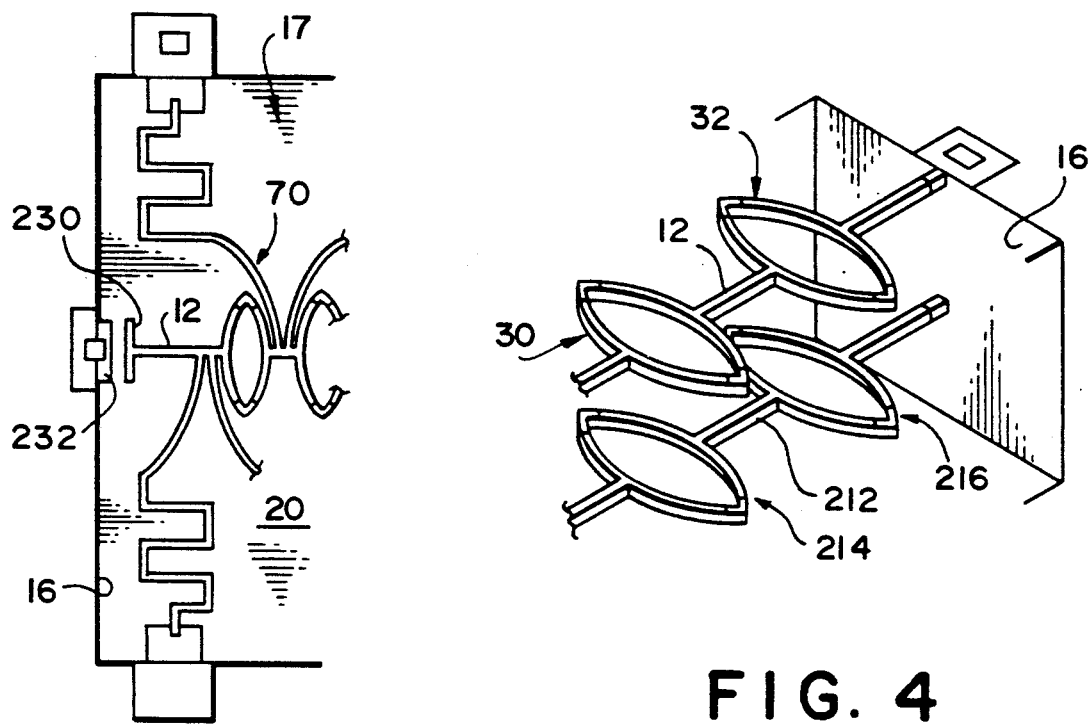
FIG. 6
FIG. 4
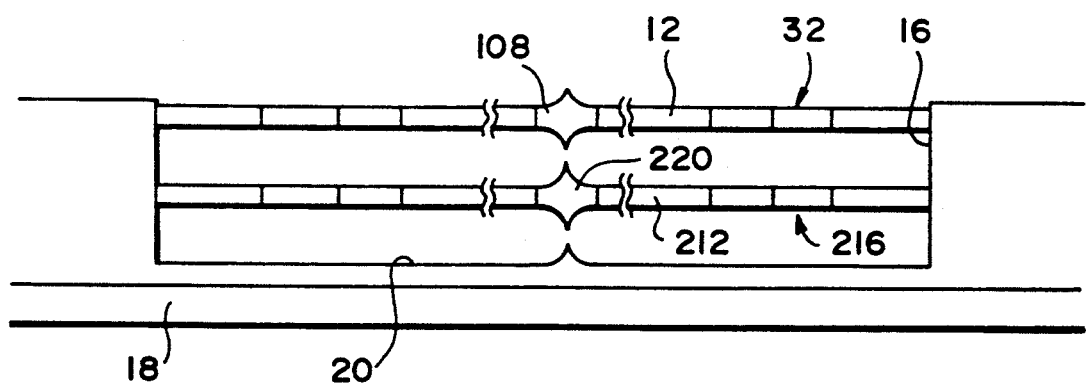
FIG. 5

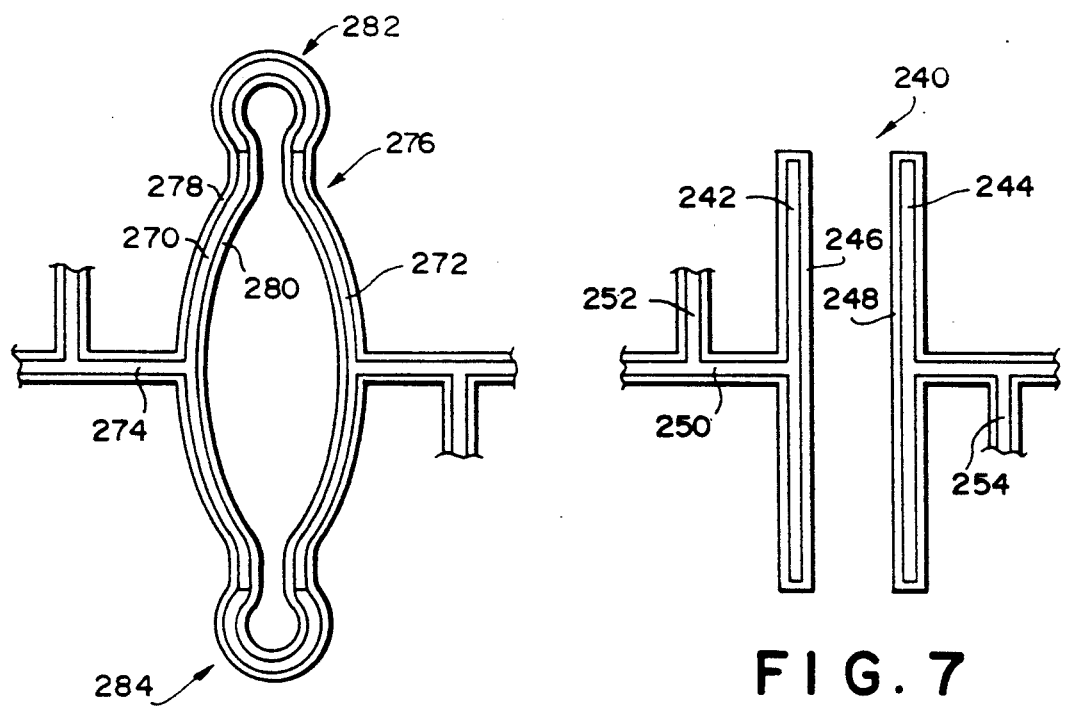
FIG. 9
FIG. 7
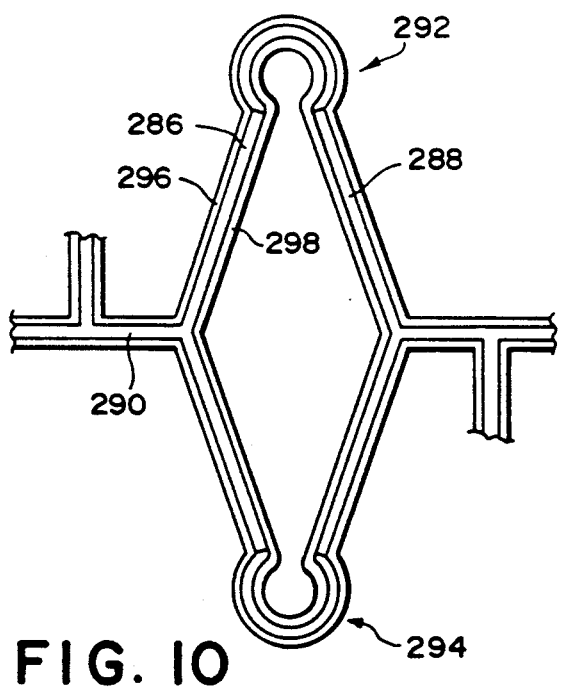
FIG. 10
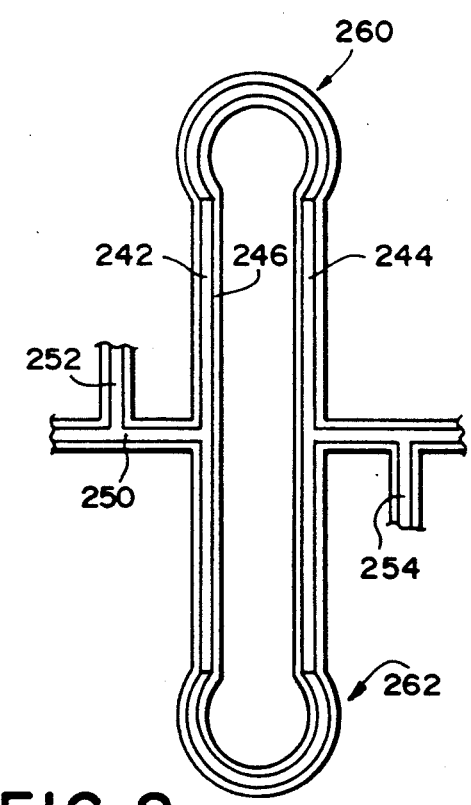
FIG. 8

MULTI-DIMENSIONAL PRECISION MICRO-ACTUATOR

The present invention relates, in general, to mechanically movable microstructures fabricated from a single crystal, such as silicon, and more particularly, to actuator structures for such devices for providing a high degree of controlled, precision motion of nanometer-scale devices.

Copending U.S. application Ser. No. 07/699,390, filed May 14, 1991 and entitled "Integrated Scanning Probe" and copending Ser. No. 868,138 filed Apr. 14, 1992 which is a continuation in part of Ser. No. 699,390, relate to microstructures of the general type to which the present invention is directed and further describe fabrication techniques for such structures. The microstructures disclosed in those applications particularly relates to self-aligned nanometer-sized probe tips fabricated on chips and to vertically stacked, integrated tunneling tips for use in sensors and analytical instruments which are based on movable, self-aligned, finely pointed tip pairs. Such tip pairs are formed, for example, on single crystal, polycrystalline or amorphous silicon beams fabricated in corresponding apertures in silicon chips and are fully integratable with electronic circuits on such chips. The copending applications further disclose unique mounting structures for such scanning and tunneling tip pairs which permit both detecting and controlling tip motion, and accordingly the disclosures of the aforesaid application Ser. No. 07/699,390 and its continuation in part application Ser. No. 868,138 are hereby incorporated herein by reference.

Microfabrication techniques are described in both Ser. No. 07/699,390 and Ser. No. 868,138, wherein the selective oxidation of single crystal substrates produces electrically and thermally isolated, released, single crystal structures such as beams and islands, and provide nanometer-scale self-aligned tips carried by such beams or islands. The self-aligned tips may have conical or wedge shapes and may be either horizontal or vertical pairs or stacks of multiple pairs on beams which are separated from the underlying substrate. Separation is achieved by selectively removing material to provide cantilevered and insulated structures which allow relative three-dimensional movement of the tips in the aligned pairs.

The fabrication techniques disclosed in the aforesaid applications begin with a process in which a solid structure consisting, for example, of an island, is electrically and then mechanically isolated from its underlying substrate. The structure is formed from a single crystal of material such as silicon, by selective lateral oxidation. In one preferred process, islands of silicon (for example) are first formed by etching trenches in a silicon substrate chip. The structure is then isotropically or anisotropically recess-etched around the bottom portion of the islands and the recesses are thermally oxidized in a lateral direction to produce isolated silicon islands. The degree of isolation of each island is tailored by controlling the lateral oxidation of the material connecting that island to its underlying substrate. By controlling this lateral oxidation, the support material is selectively removed so that tapered or conical silicon filaments of 10 to 100 nm in width can be formed between a silicon island and the underlying silicon substrate. By further oxidation, the filaments can be removed at the narrow part of the connection to form self-aligned tips or wedges having ends which taper to the diameter of the filament, or less, thus producing nanometer-scale dimensions at the ends of the tips. The tips so produced can be used in microscopic versions of analytical instruments which are fully integrated with electronic circuits on the same silicon chip.

The beam or beams which support the self-aligned tips may be formed, through the same patterning and etching techniques, to incorporate mounting springs which permit axial as well as lateral motion of the beams with respect to a surrounding substrate. In addition, the beams may be formed to incorporate capacitive or magnetic drive structures which may be energized by suitable potential differences or magnetic fields to produce motion in the beams. In a preferred form of the invention as described in Ser. No. 07/699,390 and in the continuation in part application Ser. No. 868,138, a pair of coplanar linear beams are mounted on a base to intersect each other at right angles, with the beams being connected to each other at their intersection to form an X-shaped tip support in, for example, a horizontal plane. The beams are cantilevered above a substrate and are mounted by means of springs so that each beam is movable axially and laterally in the horizontal plane defined by the beams, and is also movable vertically with respect to that plane. One tip of a self aligned tip pair preferably is formed at the intersection of the beams and circuitry is provided to detect the relative motion of the beams with respect to a second of the self-aligned tip pair, the second tip being mounted adjacent to the first tip. This second tip may be formed on a planar surface adjacent to the beam so that it is stationary, or it may be mounted on a cantilever beam or a second pair of crossed beams also forming an X-shaped tip support. The second pair of crossed beams may also be mounted by means of springs to the surrounding base, with each X-shaped tip support thereby being movable in its own plane in X and Y directions and vertically in a Z direction.

As disclosed in the aforesaid applications, each pair of beams in the linear crossed-beam configuration carries corresponding capacitive drive structures for controlling and sensing the motion of the respective beams, and thus of the tips which they support. In one form of the invention, the capacitive drive consists of movable "comb"-shaped capacitors on each end of each beam between the respective springs and the surrounding stationary base. The springs produce restoring forces when the beams are moved by energization of the capacitors. In addition, opposed capacitive plates may be provided on the beams for controlling and sensing vertical motion. Such a structure permits precise and accurate measurement of, or control of, the relative motion between opposed aligned tips to allow a wide variety of microscopic and analytical measurements.

In another form of the invention described in the aforesaid copending applications, the self-aligned, opposed tips may be formed at the intersection of a pair of crossed offset beams, wherein each beam is formed of two opposed, generally L-shaped beam segments, with corresponding legs of the segments being interconnected by a tip support leg to form the beam. Capacitive plates are formed on the sides of each of the beam segments to move the segments laterally, with the resilience of the material from which the beams are formed and the length of the beams serving to provide the spring action required for proper control of the motion of the tip mounted at the intersection of the support legs.

Although the spring and capacitor structures described and illustrated in Ser. No. 07/699,390 and in Ser. No. 868,138 provide accurate and reliable supports and permit precisely controlled motion in the movable tips, the need to form the springs and the drive capacitors as separate elements imposes undue complexity on the structure. Furthermore, both the comb structure interposed in the tip support beam to provide longitudinal motion and the capacitive plate structure located adjacent the tip support beam to provide lateral motion have been found to be limited in the range of motion which they can provide for the tip. Thus, for example, the comb structure has a limited axial motion which is dependent upon the depth of the comb structures and furthermore has a very limited lateral motion which is limited by the spacing between the adjacent capacitive plates. The lateral plate capacitive structure is similarly limited by the spacing between adjacent plates and by the fact that lateral motion of one plate with respect to the other reduces the available capacity for controlling or sensing motion.

SUMMARY OF THE INVENTION

It is, therefore, an object of the present invention to provide an improved microactuator structure for supporting movable nanometer-scale structures.

It is another object of the invention to provide an improved microstructure for supporting nanometer scale devices and for providing precise and controllable motion of such structures.

A still further object of the invention is to provide a method of fabricating improved microstructures and in particular for fabricating nanometer scale devices capable of large-scale precision motion.

A more particular object of the invention is to provide relatively movable capacitive drive plates for supporting nanometer scale microstructures and wherein the capacitor plates permit large scale precision motion of a structure in both longitudinal and lateral directions.

Another object of the invention is to provide a method of fabricating movable capacitive plates for providing longitudinal, or axial, motion of nanometer-scale structures upon the application of an electrical potential across the plates, and wherein the structure permits a wide range of lateral motion of the device without adversely affecting the axial motion.

A still further object of the invention is to provide a capacitive drive for microstructures which utilizes flexible relatively movable capacitive plates to provide a constant drive force over a wide range of motion of the microstructure under control.

Another particular object of the invention is to provide an actuator for precisely moving at least one of a pair of opposed self-aligned nanometer-scale tips in a microstructure, the actuator consisting of a plurality of capacitors serially arranged along a support beam for a tip, the capacitors being selectably energizable to apply electrical fields across adjacent relatively movable plates to control the spacing between opposed plates, and to thereby regulate the motion of the tip carried by the beam.

Still another object of the invention is to provide actuators for a microstructure wherein a plurality of support beams each have a plurality of selectably energizable serial capacitors having relatively movable plates, the capacitors being fabricated in a common plane to support a common element for precise control of the motion of that element in that plane.

A further, and still more particular object of the invention is to provide an actuator for a microstructure wherein the actuator includes a plurality of capacitors arranged in parallel to support at least one of pair of opposed, self-aligned tips.

Another object of the invention is to provide a plurality of selectively energizable capacitive actuators having relatively movable plates arranged in series and/or in parallel to support self-aligned nanometer-scale tips, and to provide selective activation of the actuators for precision control of tip motion.

Briefly, the present invention is directed, in one preferred embodiment, to an integrated, single crystal silicon (SCS) microactuator structure which is capable of large scale precision motion in both X and Y dimensions of a plane. In one form, the microactuator is a shell-like oval ring which consists of two cantilevered, opposed, concave, relatively-movable single crystal silicon arms each having a cross sectional dimension of about 150 nm by about 1,000 nm. These two curved SCS arms form spaced capacitive plates which are electrically isolated from each other but which preferably are mechanically joined at their outer ends by a suitable isolating material such as a coating or layer of electrically insulating nitride. When an electric potential is applied between the two curved SCS arms, an electric field is induced between them. The field is strongest near both outer ends of the opposed, concavely-shaped curved surfaces, where the plates are closest together. The outer ends are held in spaced relationship by the isolating material which mechanically joins them. This material preferably is a thin, flexible strip (or strips) which may be bowed to form a bias spring connection between the opposed capacitor plates. The spring material is shaped to hold the plates in a predetermined relative position so that upon the application of a voltage across the plates, they will tend to move toward each other (or apart, depending on the polarity of the applied potential) against the spring bias. Upon release of the potential, the springs return the plates to their original spacing.

The capacitive plates are mounted in pairs and in series in a longitudinal beam to divide the beam into adjacent segments, with the plates of each pair being relatively movable in the longitudinal direction of the beam to lengthen and shorten the beam. The electric field force applied between the plates may attract the opposed plates (for example) to cause them and their respective beam segments to move toward each other. As this force tends to bring the outer ends of the plates closer together against the bias of the end springs, the middle portions of the opposed plates are also drawn toward each other so that the electric field force between the middle portions becomes stronger, causing the plates to flex inwardly, bringing them closer together and thereby adding to the force which draws the plates together. The electric field provides an increasing outward axial force throughout the inward motion of the plates which is in opposition to the increasing spring bias until the two opposed plates are uniformly close together so that the motion of the plates is linear with respect to the applied potential. The opposed curvature of the plates acting as a spring bias, cooperates with the end springs to urge the plates apart in opposition to the applied electrical force field, with the mechanical spring force acting against the force exerted by the potential applied across the capacitive plates. In this way the axial motion of the plates, and of the beam in which they are mounted, can be precisely controlled. Any desired number of pairs of curved plates may be mechanically coupled together in series along the length of a beam to provide the desired length of longitudinal motion for the assembly. Pairs of curved plates can also be mechanically connected in parallel to provide the desired force for moving the tips. The movable beam is in the form of a cantilever, secured at one end with its other end extending over and spaced above the underlying substrate so that it is free to move laterally and vertically, as well as to extend and contrat longitudinally with the application of a potential, thereby providing three-dimensional motion of the actuator.

In a preferred form of the invention, a microstructure such as a pair of crossed beams intersecting at a support region for opposed tips is provided, with the structure incorporating in each of the crossed beams one or more series capacitive actuators to provide longitudinal, or axial beam motion. A first set of actuators provides axial motion along, for example, an X axis of the structure while a second set of actuators provides motion along a Y axis to produce two-dimensional controllable motion of the structure in the X-Y plane. Longitudinal, or axial, motion along the X axis produces lateral motion of the Y-axis beam, and vice versa. The range of motion of the structure is determined by the total number of individual series capacitive actuators provided. The crossed beams are also movable in the Z direction, perpendicular to the X-Y plane of the structure.

Electrical potentials are applied to the opposed capacitive plates by means of flexible electrically conductive connector arms which accommodate the motion of the beams. The connector arms preferably are coplanar with the beams and the capacitive plates, and serve to electrically interconnect selected electrically conductive beam segments. Connector arms also may lead to circuit elements on the surrounding silicon chip to provide electrical connection to external control circuitry. These connector arms also provide cantilever support for the beams.

The fabrication sequence for the microactuator structure of the present invention is a modification of the selective lateral oxidation process described in the aforesaid U.S. Ser. No. 07/699,390. Lateral oxidation is used to define the beams and the capacitive actuator structure, with the structures being selectively released by means of hydrofluoric acid which isotropically etches away the field oxide beneath the beam structures. The modification includes the provision of a coating of silicon nitride film to provide mechanical support for the structure before the hydrofluoric acid releasing etch. The capability for forming silicon nitride segments which simultaneously electrically isolate while mechanically joining individual silicon elements of the actuator structure facilitates the construction of the microactuator structure. The series arrangement of the capacitive actuators between axially aligned beam segments provides the capability of mechanically amplifying the motion produced in a single actuator so that relatively large scale motion is attainable with relatively low electrical potentials, while the connection of parallel actuators provides added strength and precise control.

Although the invention is shown as utilizing two crossed beams, or four beam arms, to support a tip support region, it will be apparent that three beam arms equally spaced around the tip support region or more than four beam arms so arranged can be used to provide two dimensional motion of the tip. Furthermore, plural beam arms can be connected in parallel with each other between a stationary mounting point and the tip support, with each arm having plural capacitors in series, in order to add to the control of the tip. It will also be apparent that microstructure elements other than opposed, self-aligned tips may be moved and controlled by the capacitive actuators of the present invention.

The capacitive plates preferably are concave, but if desired various other shapes may be used. For example, the opposed plates can be flat and parallel to each other, they can be formed either with or without end bias springs, or the plates can be formed with complex curved or angled surfaces in order to obtain the desired control of the motion of the tip supported by the actuator of the present invention.

BRIEF DESCRIPTION OF THE DRAWINGS

The foregoing and additional objects, features and advantages of the present invention will become apparent to those of skill in the art from a consideration of the following more detailed description of a preferred embodiment thereof, taken in conjunction with the accompanying drawings, in which:

FIG. 4 is a simplified diagrammatic illustration in top perspective view of a parallel arrangement of microstructure actuators;

FIG. 5 is a side elevational view of the parallel actuator of FIG. 4;

FIG. 6 is a partial top plan view of a modified form of the microstructure of FIG. 3; and FIGS. 7-12 diagrammatically illustrate variations in the structure of the actuator of FIG. 1.

DESCRIPTION OF PREFERRED EMBODIMENTS

Figures 1, 3A:
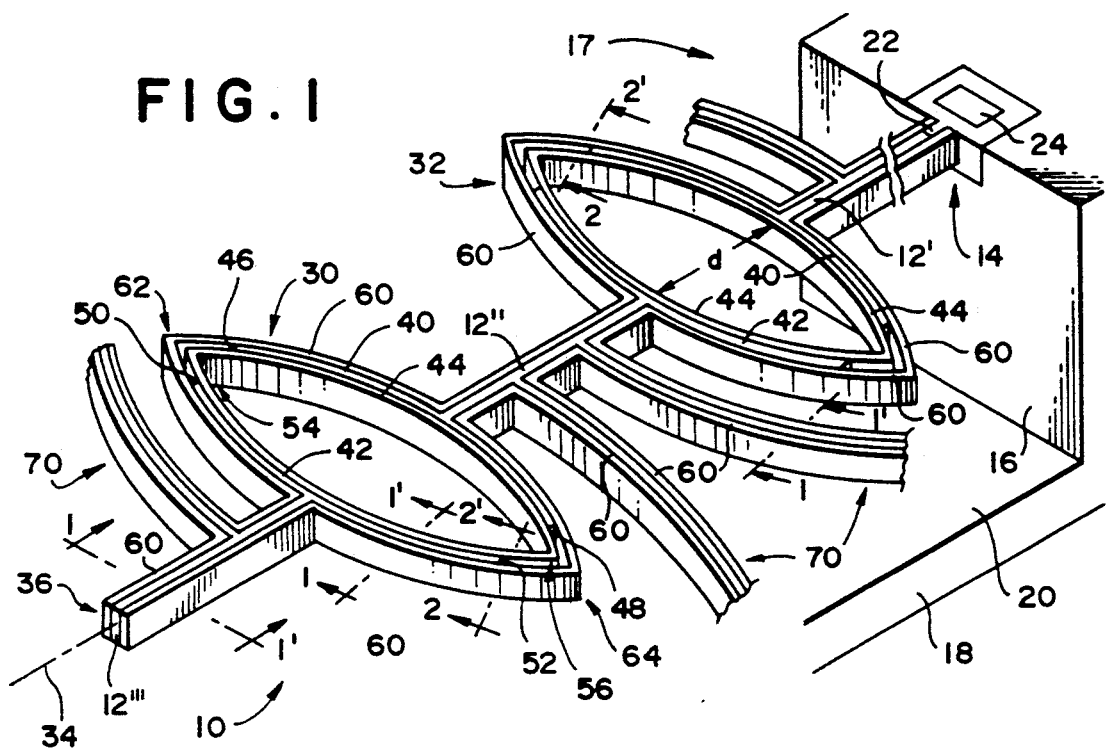
FIG. 1 is a perspective view of a pair of microstructure actuators constructed in accordance with the present invention.
FIGS. 3 and 3A are top plan views of microstructures movable in an X-Y plane under the control of a plurality of actuators constructed in accordance with the present invention.

Turning now to a more detailed consideration of the actuator of the present invention, there is illustrated in FIG. 1 a microstructure 10, which takes the form of a cantilever beam 12 secured at one end, for example at 14, to a fixed structure such as the surrounding vertical wall 16 of an aperture 17 formed in a substrate indicated generally at 18. The substrate 18 preferably is part of a wafer carrying a material such as single crystal silicon in which conventional integrated circuits may be formed in known manner, and which, in accordance with the invention, incorporates a mechanically movable microstructure. Such an integrated microstructure has a wide variety of applications and thus is capable of functioning, for example, as a sensor in an analytical instrument such as a tunneling electron microscope. The beam 12 preferably is spaced above and is parallel to the horizontal floor 20 of the aperture formed in substrate 18 and may incorporate the self-aligned opposed tip structure described in the aforesaid copending application Ser. No. 07/699,390. The beam 12 preferably is electrically conductive, and includes an insulated portion 22 where it joins the wall 16 so that the beam is electrically insulated from the surrounding substrate. If desired, an electrical contact pad 24 may be located in the substrate near the end of the beam to provide a connection point for electrical leads which are to be interconnected with the beam.

In the illustrated embodiment, beam 12 is generally perpendicular to end wall 16 and extends outwardly therefrom in a horizontal plane which is parallel to the floor 20 of the aperture 17 in which it is formed. The beam, in accordance with the present invention, includes microactuators such as those illustrated at 30 and 32 which are connected in series along the beam to divide the beam into a plurality of longitudinally aligned segments which are relatively movable along the axis of the beam. The microactuators are capable of moving the beam 12 along its longitudinal axis 34 by moving the individual beam segments with respect to each other so that the free end of the beam, generally indicated at 36, can be moved axially toward or away from the fixed end 14 of the beam at wall 16 upon energization of the actuators.

Each microactuator, for example, actuator 30, is formed by a pair of opposed, concave arms such as arms 40 and 42, which are fabricated from the same material as is the beam 12 and the substrate 18 by a fabrication process to be described hereinbelow. The arms 40 and 42 preferably have rectangular cross sectional dimensions; for example, 150 nm by 1,000 nm, and are formed at the same time the beam 12 is formed. The arms are interposed in series in the beam and are electrically isolated from each other, as by a layer of insulating material 44 which, in a preferred form of the invention, also mechanically joins their opposite ends to hold them in the desired relationship. These arms are sufficiently thin and flexible to act as springs to hold the beam in a rest, or neutral, position and shape.

As illustrated in FIG. 1, the arms 40 and 42 are generally horizontal so that they are parallel to floor 20, extend in a direction generally perpendicular to the axis 34 of beam 12, and are spaced apart along the direction of axis 34. The actuators 30 and 32 divide the beam into a series of axially aligned segments 12', 12" and 12''' (generally referred to as beam 12) and the opposed spaced arms of each actuator form the two plates of a capacitor. The outermost ends, or the upper and lower ends (as viewed in FIG. 1) 46 and 48 of concave arm (or plate) 40 are spaced apart from the corresponding upper and lower ends 50 and 52 of the opposed arm (or plate) plate 42, respectively, with the arms 40, 42 curving from the outermost ends toward their centers in a conave shape to electrically isolate them from each other. The insulating layer 44, which in the preferred embodiment is silicon nitride, extends beyond the ends 46 and 50 of the adjacent arms, as generally indicated at 54, to act as a flexible spacer to mechanically join and support the two opposed plates 40 and 42 at that upper end. Similarly, at the lower end (as viewed in FIG. 1) of the capacitive plates, the inner insulating layer 44 joins the two plates mechanically at 56. These two flexible spacers act as bias springs to position the relatively movable plates 40 and 42 at their rest position.

In the preferred form of the invention, the outer surfaces of plates 40 and 42 are also covered by an insulating layer 60 such as silicon nitride, which extends outwardly beyond the ends of the plates 40 and 2, as generally indicated at 62 and 64 to provide additional mechanical spacers and flexible bias spring supports for the capacitor plates, or arms, 40 and 42. It will be noted that the inner and outer insulating bias spring layers 44 and 60 are spaced from each other at the end portions 62 and 64; however, it is not essential that they be so spaced. Furthermore, where a single one of the layers 44 and 60 is sufficient to provide the required mechanical support and biasing, only one such layer need be provided.

It will be understood that the second actuator 32, which is connected in series along the axis 34 with actuator 30, is constructed in a manner similar to actuator 30 and thus is not described in detail. The actuators divide the beam into relatively movable segments so that upon the application of a potential across the actuator plates, the plates can move axially with respect to the fixed end 14. This plate motion will move the segments and thus expand or contract the length of beam 12. Additional actuators may be provided in series along the length of beam 12 in sufficient numbers to provide the degree of motion along axis 34 that is desired for a particular application.

Although not essential, the insulating layer 60 may be continued along the side walls of the beam 12 as illustrated to provide a protective and mechanically supportive layer for the beam.

The application of electric potentials of opposite polarity to the two curved, opposed flexible plates 40 and 42 produces an electric field across the plates which is inversely proportional to the square of the distance between them, and which tends to draw the plates together. Initially, the force at the outer ends of the concave plates; i.e., between ends 46 and 50 and between ends 48 and 52, is greater than the force at the axis of the beam 12. Since the beam segments are relatively movable, the electric field force so produced tends to draw the opposed plates 40 and 42 together, causing the insulating support material at regions 54, 56, 62 and 64 to bend. The insulating material acts as a spring to resist the motion of the plates toward each other so that the amount of motion is determined by the applied potential. As the plates move together, they tend to flex from the concave shape toward a planar shape, so that the central portions of the plates move closer to each other, thereby increasing the total force applied to the plates. The resilience of the plates resists the inward bending motion to further bias the plates against the motion imposed by the applied potential, so that the mechanical structure acts as a spring bias against the inward force applied by the electrical potential and tends to return the capacitive plates to their original position upon reduction of the electrical potential. In this way, the motion along axis 34 of the segments of beam 12 which are connected to plates 40 and 42 is precisely controllable by the potential applied across these plates. In similar manner, the voltage applied across plates 40 and 42 of actuator 32 produces motion in that and in the beam segments connected thereto. If the two actuators 30 and 32 are both energized at the same time, the motion of beam 12 along axis 34 will be the sum of the motion of each of the two actuators. Any number of actuators may be used along the beam to provide the desired amount of axial motion.

Electrical connections are provided to the capacitive plates 40 and 42 by means of connector beams generally indicated at 70, to be described. These connector beams are also formed of the same material as the beam 12 and plates 40 and 42, and preferably are covered by the insulating layer 60, previously described. It will be understood that the connectors 70 may be so arranged as to apply a selectable potential across all of the actuators in series, or the connectors can be fabricated so that each actuator can have a separate potential applied to it. Thus, for example, by applying potentials to individual actuators, it is possible to provide a digital control of the motion of beam 12, with the motion of the beam being proportional to the number of actuators that are energized. Alternatively, when the actuators are connected in series to the same potential, the motion of the beam will be cumulative of the motion of each actuator and will corresponding to the selected value of the potential, and, control is obtained not by the number of actuators that are energized, but by the magnitude of the potential applied to the actuators. Any combination of these two methods of control may also be used.

It will be understood that the amount of longitudinal motion obtained by the actuators 30 and 32 is dependent upon the spacing between the capacitor plates 40 and 42 and accordingly, the axial motion available can be determined by the size of the various actuators. A range of actuator sizes varying from large to small can, therefore, be provided in series in a single beam to provide coarse and fine adjustments of beam motion through the application of potentials to selected capacitors. Within each capacitor, furthermore, the motion of the plates with respect to each other is linearly proportional to the applied voltage so that control is precise.

Figure 2:
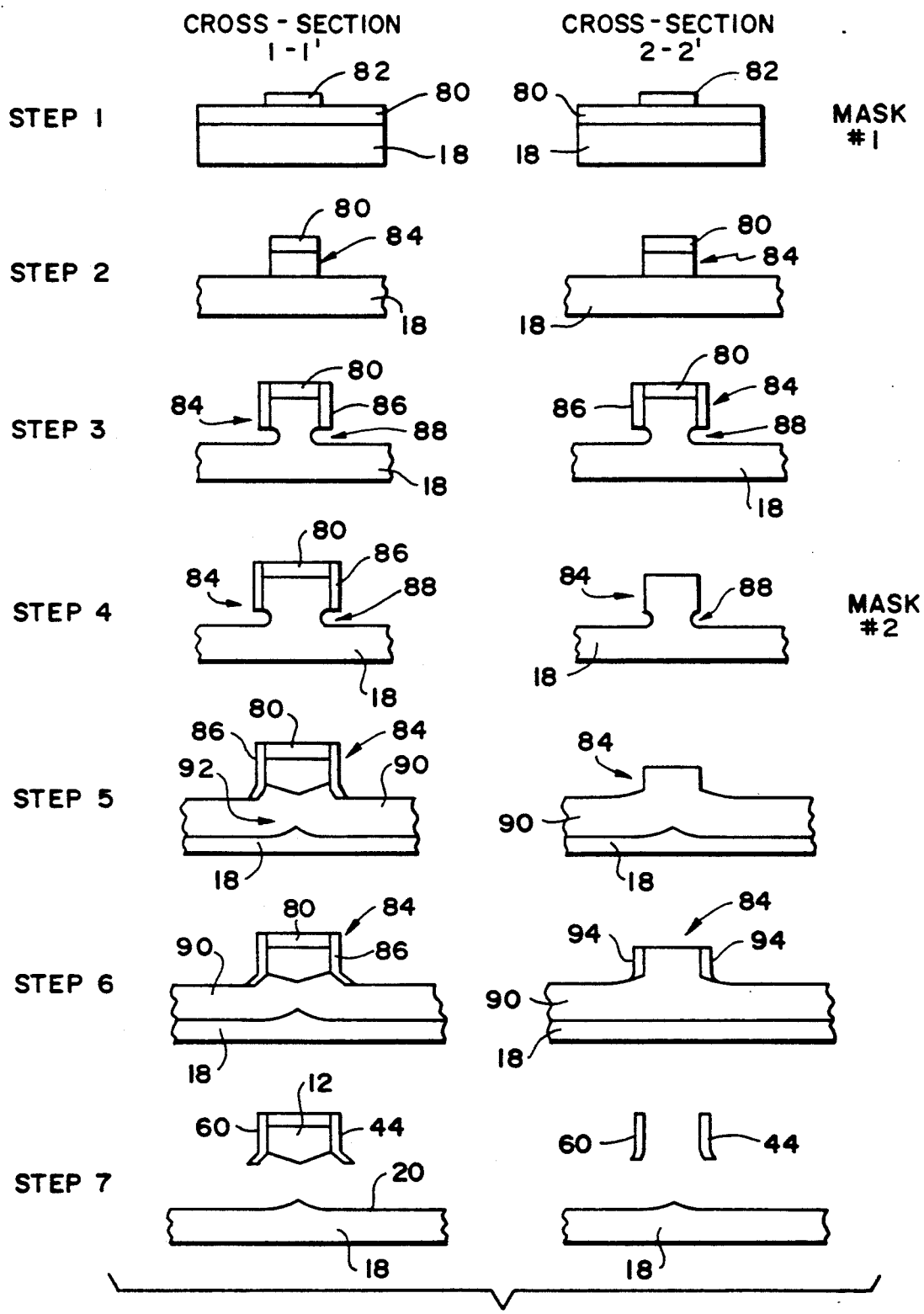
FIG. 2 is a diagrammatic illustration of the process steps used in fabricating the actuator of FIG. 1.

FIG. 2 illustrates in diagrammatic form a method for fabricating the beam 12, the arms 40 and 42, and their insulating layers 44 and 60 as well as the process for fabricating the end portions of the actuator where only insulating spacer and support layers are provided. The steps of FIG. 2 under the heading "cross section 1—1'" illustrate the former structure, while steps 1 through 7 under the heading "cross section 2—2'" illustrate the method for fabricating the end portions of the actuator. Sample locations of these cross-sections are illustrated in FIG. 1.

The starting substrate 18 preferably is an arsenic-doped, n++, single crystal silicon wafer on which is coated a suitable dielectric top surface layer 80, the layer 80 preferably including silicon nitride. For example, the layer 80 may be an oxide-1/nitride-1/oxide-2(30/100/300 nm) dielectric stack which will cover the top of the island which is to be formed during a subsequent oxidation step. The relative thicknesses of the layers may vary; however, the layer 80 should include nitride as an oxidation mask for this process. The dielectric stack 80 is patterned, at step 1, in both cross sections 1—1' and 2—2' by a first mask using, for example, tri-level resist direct-write electron beam lithography and an aluminum lift off to thereby form mask 82. This mask, in top plan view, has in the desired shape of the beam 12, of the actuators 30 and 32, and of the connectors 70. Thereafter, the dielectric layer 80 is etched around the mask 82 by reactive ion etching (RIE) in a CHF$_3$ chemistry without erosion of the aluminum mask 82. Mask 82 is then further used to transfer the pattern into the substrate 18 during a subsequent trench etch, illustrated in step 2. A Cl$_2$/BCl$_3$ chemistry consumes the aluminum layer 82 but leaves the top surface oxidation mask formed in layer 80 virtually intact, again as illustrated in step 2 of FIG. 2. This trench etch produces the aperture 17 and its surrounding walls 16 in the silicon substrate 18, as described above with respect to FIG. 1, while leaving island 84 intact. Again, the shape of the island in top plan view is that which was defined by mask 82 and corresponds to a desired microstructure, such as that illustrated in FIG. 1.

The silicon wafer 18 is then completely coated with a second dielectric layer 86 including silicon nitride, and this layer is then anisotropically etched to clear the bottom of the trenches surrounding island 84. The second dielectric layer remains on the side wall of the island, as indicated at 86, the thick layer 80 at the top of the island insuring that the bottom of the trenches can be overetched to expose the silicon substrate without eroding completely through both layer 86 and the masking layer 80.

Thereafter, an isotropic recess etch is performed to etch the top surface of the silicon layer 18 to thereby produce a recess 88 in the sides of the island 84. The recess extends beneath the nitride layer 86 on the side walls of the island and starts the process of separating the island 84 from the underlying substrate 18. Thus, this etching step reduces the width of the island in the region of recess 88.

The island 84 may have any desired shape in its top plan view, and thus may be rectangular, round, square or configured in any desired way, depending upon the desired shape and dimensions for the beam 24, for the actuators 30 and 32 and for the connector beams 70. In addition, the island is shaped for the production of conical tips or wedges at selected locations, again in the manner described in copending U.S. application Ser. No. 07/699,390. It will be understood that the recess 88 extends completely around the island 84 in order to control the subsequent lateral oxidation step.

Step 4 of the process illustrated in FIG. 2 is a selective stripping of the dielectric layer 80 from the island 84 to permit selective oxidation of parts of the island for the purpose of providing electrical isolation of the remainder of the island. This stripping of layer 80 is not illustrated at the cross section 1—1 in FIG. 2, since that represents the beam 12 and the capacitive plates 40 and 42 which are to remain electrically conductive, but such oxidation may be provided at other parts of the beam structure, such as at region 22 (FIG. 1) and at cross section 2—2' of the actuator. Such a selective stripping of portions of the dielectric layer 80 is carried out by means of a suitable mask member 2 used in this process.

Oxidation of the exposed silicon material 18 in the trenches in the recesses 88, and in recesses formed by stripping layer 80, is carried out to form a silicon dioxide layer 90, as illustrated in step 5. This oxidation extends laterally into the recesses 88, thereby reaching under the part of the island 45 protected by layer 86, and also extends into the beam 12 in the recesses formed in layer 80. As the oxidation process proceeds, it forms the layer 90 in the recess and pushes the lower edge of layer 86 outwardly, as illustrated generally at 92 in step 5. The oxidation proceeds at a substantially constant rate in the silicon material, and it will be understood that the deeper the recess 88, the more quickly the top part of island 84 will be undercut and isolated from substrate 18 by the oxidation process. As noted at 92 in step 5, at cross section 1—1', the undercutting process produces an opposed tip-shaped profile between the bottom of island 84 and on the top surface of substrate 18. The spacing and sharpness of these opposed tips can be carefully controlled by regulating the oxidation process. In those parts of beam 12 where no tips are required, and throughout the length of the capacitor arms 40 and 42 as well as along connector beams 70, such tips are generally not required, and accordingly the oxidation process continues until the island 84 is spaced above the silicon layer 18 by a distance sufficient to provide freedom of motion of the cantilever structure when it is released, as described below.

The oxidation process of step 5 also oxidizes the island 84 in the region 22 and at cross sections 2—2', since island 84 is unprotected by the nitride layers 80 and 86 in those selected areas.

In step 6, a silicon nitride layer is again deposited over the entire surface and then is isotropically etched back, to provide nitride side walls 94 on the island portion 84 at cross sections 2—2' and to provide a thickened nitride side wall 86 on the island portion 84 at cross sections 1—1'.

At step 7, selected portions of the field oxide layer 90 are isotropically etched away. As indicated at cross section 1—1' in FIG. 2, this releases the island 84 from substrate 18 at such locations to form the cantilevered beam 12 with its side wall layers 44 and 60 of silicon nitride spaced above the floor 20 of the substrate 18. At cross sections 2—2', the removal of the oxide layer 90 isolates the nitride side walls 94 to produce the spaced apart nitride support and spacer layers 44 and 60 which then serve to mechanically support the opposed capacitive plate beams 40 and 42, in the manner described above with respect to FIG. 1.

Figure 3:
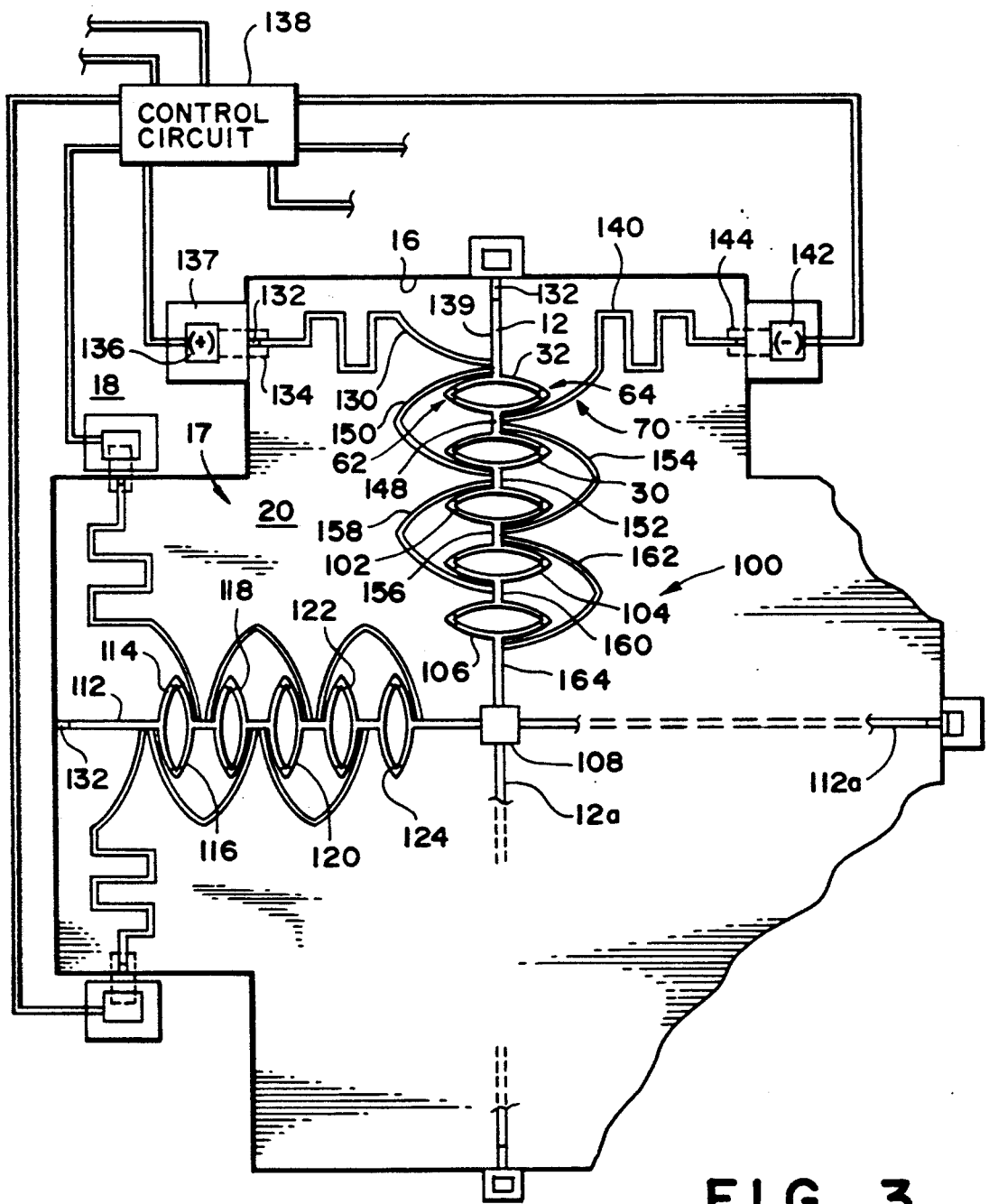

As indicated above, any number of actuators can be connected in series in beam 12 to produce a desired degree of mechanical motion. FIG. 3 illustrates in diagrammatic form an integrated microstructure which utilizes a multiplicity of actuators interposed in crossed beams to provide precision motion in X and Y directions for a wide range of instrument, sensor, and other applications. Thus, for example, the actuators 30 and 32 of FIG. 1 may be a part of a microstructure of the crossed beam type generally indicated at 100 in FIG. 3. In this case, the beam 12 is extended through additional series actuators 102, 104 and 106 to a central support area 108 to provide a first Y-axis support leg for area 108. A duplicate of beam 12 may be provided on the opposite side of support area 108 (as viewed in FIG. 3) to provide a second Y-axis support leg 12a (shown in part). In similar manner, left and right beams 112 and 112a provide X-axis support legs for support area 108, the X and Y portions cooperating to provide controlled precision motion of area 108 in the X-Y plane defined by legs 12, 12a, 112 and 112a. It will be understood that support area 108 may incorporate one or more nanometer-scale tips which preferably would include a tip which is part of an opposed, self-aligned tip pair formed in the substrate during fabrication of the actuator beams, using the lateral oxidation steps described above with respect to FIG. 2. Alternatively, the support area 108 may incorporate other mechanically movable devices such as a switch arm or the like.

As illustrated, the leg 112 includes series actuators 114 through 124 to provide motion along the X axis of microstructure 100. Since the beams 12, 12a, 112 and 112a are all separated from and cantilevered over the floor 20 formed in the substrate, the axial motion of Y-axis beams 12 and 12a shifts X axis beams 112 and 112a in their lateral directions. Similarly, axial motion of X-axis beams 112 and 112a shifts Y-axis beams 12 and 12a in their lateral directions, thereby providing freedom of motion of area 108 in the X-Y horizontal plane. Because of the mechanical connections at the ends of the corresponding capacitor plates of the individual actuators provided by the spacers 54, 56, 62 and 64 described above, lateral motion of the beams will not shift the plates with respect to each other, and accordingly such motion does not change the electrostatic force applied across individual actuators by the applied potential. As a result, the motion of the tip carried by section 108 can be precisely controlled in any direction.

Electrical connections to the actuator plates are made by way of connectors 70, as discussed above. One arrangement of such connectors for providing the same potential across each of the series actuators in one leg of the microstructure 100 is illustrated in FIG. 3. The connectors 70 are fabricated using the process of FIG. 2 at cross section 1—1', and thus include a central beam portion and nitride layers on the side walls. However, the nitride layers on the actuators, on the beam, and on the connectors, are not illustrated in FIG. 3 for simplicity, although the nitride mechanical connections between the actuator capacitor plates are generally indicated in simplified form at 62 and 64.

In the embodiment of the invention illustrated in FIG. 3, which is exemplary of the wide variety of microstructures that can be used in combination with the actuators of the present invention, a first one of the connectors 70 is mechanically connected, as illustrated at 130, between the beam 12 and the wall 16 of the surrounding substrate 18. The connector 130 is fabricated as a cantilever over the floor 20 of aperture 17, and may include an insulating segment 132 adjacent wall 16 for electrical isolation from the substrate 18. An aluminum conductor 134, shown in dotted lines, provides an electrical path between connector 130 and an electrical contact pad 136 on the substrate 18. Pad 136 may be located within an insulator 137 on the surface of the substrate, and may be used to make electrical connection with an external control circuit 138 for supplying control potentials to the actuators. Circuit 138 may be a suitable integrated circuit fabricated on the same chip or wafer on which is located the microstructure 100 to provide a voltage, for example a positive voltage, by way of connector 130 to a first segment 139 of beam 12. Since beam 12 is fabricated from an electrically conductive material and is insulated from the wall 16 by an insulator 132, this places a positive potential on the upper plate of actuator 32 (as viewed in FIG. 3).

A second connector 140 is connected to a negative electrical source at a second contact 142, also mounted on the substrate 18 adjacent wall 16, with electrical connection being made to connector 140 by way of a conductor 144, shown in dotted lines. Connector 140 is connected to a second segment 148 of beam 12, and thus provides a negative potential to the lower plate of actuator 32, again as viewed in FIG. 3. The application of a potential across actuator 32 produces a corresponding force between the upper and lower plates thereof and produces axial motion in beam 12, as previously explained.

Segment 148 of beam 12 extends between the lower plate of actuator 32 and the upper plate of actuator 30, thereby also applying the negative potential to the upper plate of actuator 30.

A positive voltage is applied to the lower plate of actuator 30 by means of a connector 150 which extends between segment 139 of beam 12 and a segment 152 of beam 12 connected to the lower plate of actuator 30. Accordingly, connector 150 transfers the positive potential from segment 139 to segment 152 so that this positive potential is applied to the lower plate of actuator 30. In similar manner, a connector 154 connects beam segment 148 to a fourth beam segment 156. A connector 158 connects segment 152 of beam 12 to a fifth segment 160 of beam 12 extending between actuators 104 and 106, while a connector 162 connects segment 156 to the last segment 164 of beam 12 below actuator 106. In this manner, the connectors 150, 154, 158 and 162 connect alternate sides of the actuators to opposite polarity electric potential sources so that upon application of a potential across pads 136 and 142, as from control circuit 138, all of the actuators 30, 32, 102, 104 and 106 are energized in series to produce motion in the Y-axis direction in accordance with the applied voltage.

The spring bias of the mechanical spacers between the plates of the several actuators serves to bias the actuators to their initial, or rest position, as discussed above. In addition, the connectors 150, 154, 158 and 162, are fabricated of the same materials and have similar cross-sectional dimensions as the beam 12, and accordingly are also flexible and resilient. By forming the connectors in a bowed shape, they will also serve as bias springs to return the actuators to an initial, or rest position. In similar manner, the actuators for beams 12a, 112 and 112c all are spring biased by means of such spacers and connectors, with all of the bias springs being shaped to balance the microstructure in a stable rest position. The actuators all are controllable by the application of selected potentials in the manner discussed above for arm 100, the application of potentials of opposite polarity causing the actuator plates to pull together to move their corresponding beams axially in a contracting direction and release of the potentials causing the spring bias loading of the capacitor plates to expand the beams axially, and to return them to their original positions. Thus, by applying selected potentials to the actuators on opposite sides of the central tip support 108, the support can be moved in the X-Y plane.

As indicated above, although the connections between the adjacent actuators are arranged so that the same potential is applied across each actuator in a given X or Y axis leg, it will be apparent that individual connectors can be utilized for each actuator, with insulating segments being provided in the beams between adjacent actuator plates so that individual control can be provided, if desired. In this way, each actuator can be energized with a selected potential so that digital control of the position of tip support 108 can be provided by suitable control circuits.

Although the beams 12, 12a, 112 and 112a are shown as being mounted in cantilever fashion to the side wall 16 of the substrate, it will be apparent that the beams may equally well be mounted on suitable pedestals formed on the floor 20 of the aperture 17. Such pedestals may be formed during the fabrication of the beams using the method of FIG. 2, with the pedestals being formed of a suitable oxide so as to insulate the beams from the substrate floor. One of the main features of the microstructure of this invention is that it is cantilevered over the floor 20 so as to be freely movable in the X and Y axes, as well as in a perpendicular, or Z axis direction, with the outer ends of the beams being fixed so as to provide a reference point for the motion of the beams. The connecting spacers 62 and 64 (illustrated in FIG. 3) and the connectors which extend between the adjacent segments all provide mechanical support for the structure so that it will remain essentially parallel to and spaced from the floor 20 and will lie in an X-Y plane. The microstructure is extremely small and light in weight, so that the device is easily controllable by potentials applied to the connectors from the control circuit 138.

The microstructure of FIG. 3 is shown utilizing four controlling legs for locating the tip support 108; however, it will be apparent that any number legs can be utilized, depending on the degree of control required. For example, three legs spaced apart by 120° may be utilized to provide motion in the X-Y plane, one or two legs can be used if only single axis motion is needed, or a larger number of legs than the four illustrated in FIG. 3 may be used. For example, FIG. 3A illustrates the use of eight legs 170-177 extending outwardly from a central support region 178 and secured at their outer ends to fixed supports such as the wall 180 of an aperture 182 formed in a silicon wafer. The use of a large number of control legs provides very precise control of the location of support region 178.

An additional embodiment is illustrated in FIG. 4 in diagrammatic form, wherein a beam 212 is illustrated as being fabricated to be in parallel with beam 12, the beam 212 carrying actuators such as those illustrated at 214 and 216. These parallel actuators are fabricated in the manner illustrated in FIG. 2, the process being modified to produce multiple stacked beams. Such parallel actuators may be provided to increase the force available for moving a tip support or some other structure supported at the end of the beam, or may be used to independently move a second, parallel tip structure, connected in stacked relationship with the tips carried by support 108. The relationship of the beams 12 and 212 is illustrated in side elevation view in FIG. 5, which illustrates the fabrication of a second, vertically aligned tip pair carried on support 220 in beam 212.

Thus, a plurality of actuators are used in series to obtain a desired axial extension or contraction, while plural actuators may be used in parallel, either stacked or side by side, to obtain additional force.

FIG. 6 illustrates another form of the invention, wherein the beam 12 is supported only by the connectors 70, with the end of the beam being spaced from the wall 16 of aperture 17. The location of the end of beam 12 may be controlled by means of a capacitive plate 230 fabricated at the end of the beam and located adjacent a second plate 232 mounted on the side wall 16.

Although the actuators 30 and 32, illustrated in detail in FIG. 1 and shown diagrammatically in FIG. 3, preferably are concave in shape with the end connectors such as those illustrated at 54, 56, 62 and 64 being also generally concave and meeting at acute angles in the manner illustrated in FIG. 1, it will be apparent that numerous modifications may be made. Thus, for example, as illustrated in FIG. 7, an actuator 240 may consist of a pair of parallel spaced capacitive plates 242 and 244, with each carrying an insulating layer such as those illustrated at 246 and 248 for the plates 242 and 244, respectively. The plates are fabricated in a beam 250 so as to divide the beam into segments, in the manner discussed above, and a plurality of such capacitive plate pairs may be utilized in series in the beam 250, as previously discussed. These plates do not include end spacers, so the support and alignment of the beam relies, in this case, on connectors such as connectors 252 and 254 corresponding to the connectors 150 and 154, for example. In this arrangement, the connectors must be sufficiently strong to provide proper positioning of the aligned plates, but since the thickness of the connectors is easily controllable in the method of FIG. 2, the strength and rigidity of the connectors can be designed to provide the required support for the plates. Alternatively, connectors extending around both ends of the plates for each connection may be provided so as to balance the plates and hold them parallel during axial motion of the beam.

The ends of the opposed actuator plates can be open as illustrated in FIG. 7 and can be supported by the connectors 252 and 254 because the microstructure of the present invention has very little mass; for example, on the order of $10^{-13}$ kg, so there is almost no gravitational force to misalign the beams and plates. Furthermore, the electrostatic force supplied by a potential across the plates will be on the order of $10^6$ times greater than the gravitational force, so even a very small potential applied across the plates will serve to maintain them in alignment.

As illustrated in FIG. 8, the complexity of the connector arrangement can be reduced by providing the parallel plates 242 and 244 with flexible end spacers or connectors 260 and 262. These end spacers are formed from the insulating layer 246 in the same manner as the end spacers 54, 56, 62 and 64 in FIG. 1, although their shape is different, so as to provide a spring action between the parallel plates 242 and 244.

A modified concave actuator is illustrated in FIG. 9, wherein concave opposed plates 270 and 272 are connected in series in a beam 274. The plates are curved outwardly away from each other at their outer ends, as generally illustrated at 276, so as to be concave at the center and planar and parallel at their outer ends to provide a greater initial force between the plates than is available with the concave shape of FIG. 1. The insulating layers 278 and 280 on the outer and inner side walls of plates 270 and 272 are extended beyond the ends of the plates to form bowed spacers or connectors 282 and 284. These spacers are fabricated in the manner described with respect to FIGS. 1 and 2, and are shaped to provide an improved spring action between the plates 270 and 272 upon the application of potentials to these plates.

Another modification of the microactuator of the present invention is illustrated in FIG. 10, wherein each plate is flat but angled to form a generally concave, opposed plate structure. Thus, a pair of plates 286 and 288 are each shaped in a shallow V-shape so as to be generally concave and are interposed in a beam 290. The outer ends of the plates 286 and 288 are spaced and connected by flexible spacers or connectors 292 and 294 formed from the side wall insulating material 296 and 298.

Figure 11:
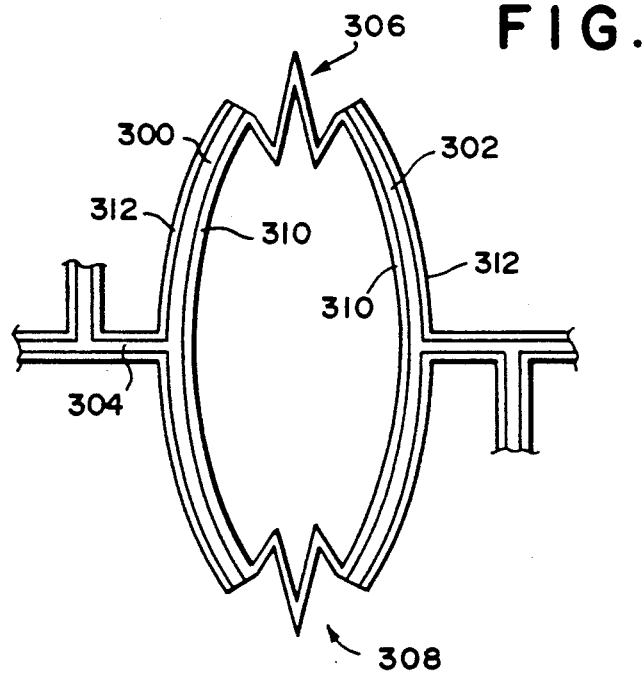

Another variation of the actuator structure is illustrated in FIG. 11, wherein concave plates 300 and 302 are fabricated serially in a beam 304. The concave plates are similar to those of FIG. 1, with the ends of the plates being mechanically interconnected by means of flexible spacers or connectors 306 and 308. In this case, however, only the inner insulating layer 310 on the two plates 300 and 302 is extended beyond the ends of the plates to form the spacers 306 and 308, thus illustrating that only one such insulating layer need be used for this purpose. The outer layer 312 could equally well be used, if desired. Another variation illustrated in FIG. 11 is the particular shape of the spacers 306 and 308. As here illustrated, the spacers are angled rather than smoothly curved, but still serve as biasing springs for the plates. A wide variety of shapes may be utilized without departing from the present invention.

Figure 12:
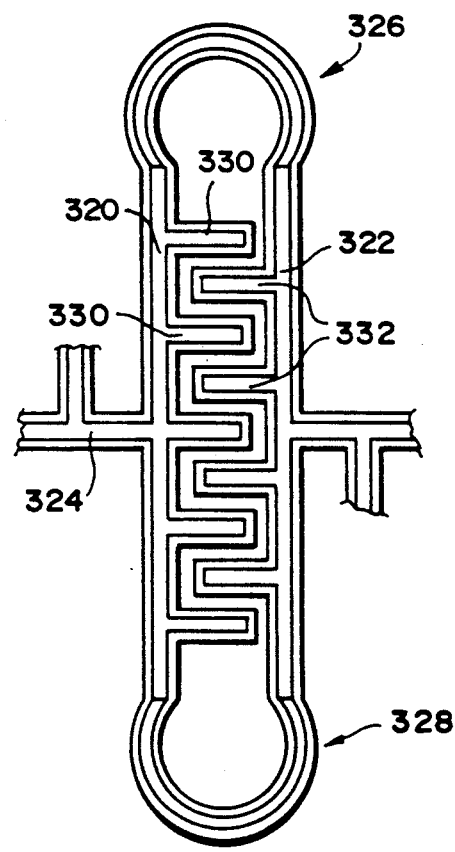

To provide additional surface area for the opposed capacitive plates, an interdigitated shape such as that illustrated in FIG. 12 may be utilized. As there illustrated, opposed parallel capacitive plates 320 and 322 are interposed in beam 324 in the manner previously described, and these plates are mechanically connected at their opposite ends by means of spacers or connectors 326 and 328, as previously described with respect to FIG. 8. However, in this case, the inwardly facing surfaces of the plates 320 and 322 carry a plurality of inwardly extending fingers such as the fingers 330 carried by plate 320 and the fingers 332 carried by plate 322. These inwardly facing fingers are interdigitated, with their respective surfaces being spaced apart but parallel, so that upon the application of a potential across plates 320 and 322, that potential will also appear between opposed fingers 330 and 332, thereby increasing the surface of the capacitive plates and increasing the available force due to the applied potential. This interdigitated, or comb like structure provides a constant force with applied potential as the plates move toward or away from each other. If desired, the end spacers 326 and 328 may be omitted.

Figure 13:
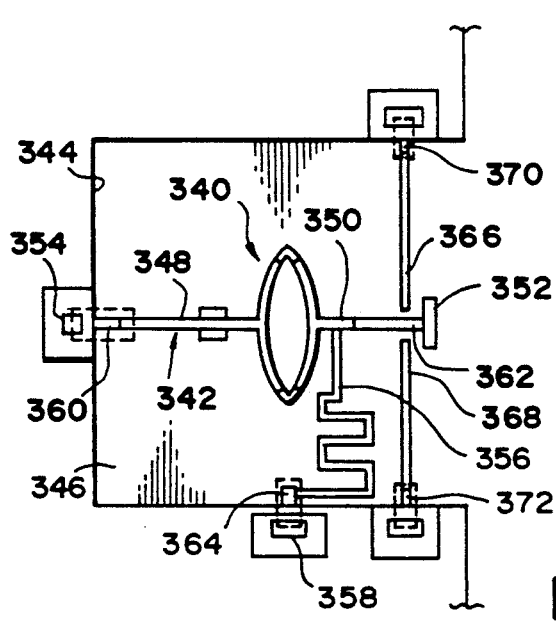
FIG. 13 shows a single microstructure actuator employed to actuate a switch.

Although the microactuator has been described in terms of controlling the axial motion of a beam carrying opposed tips at its free end, it will be apparent that other mechanical structures can equally well be supported and moved by this device. For example, as illustrated in FIG. 13, a microactuator 340, which preferably is similar to actuator 30 illustrated in FIG. 1, may be interposed in a beam 342 supported in cantilever fashion from a fixed structure such as wall 344 surrounding an aperture 346. The beam 342 extends above the floor of the aperture, as previously described, and is divided into two relatively movable segments 348 and 350 by actuator 340. At the outer, or free, end of segment 350 is a switch arm 352 which is movable along the axis of beam 342 upon application of a potential across actuator 340.

A potential is applied across the actuator by way of the actuator by way of beam segment 348 which is electrically connected to a paid 354 and by way of beam segment 350, which is electrically connected by way of a connector beam 356 to a pad 358, the pads being formed in the surrounding substrate in the manner previously described. Beam segment 348 is insulated from the substrate by insulating section 360, while segment 350 is insulating section 362. In addition, segment 350 is insulated from the surrounding substrate by insulating section 364 in connector 356.

Adjacent switch arm 352 is a pair of contacts 366 and 368, which preferably are supported in cantilever fashion from wall 344 and are insulated from the wall and the substrate at 370 and 372. These contacts may be connected to suitable external circuitry (not shown). Motion of switch arm 352 is accomplished by energization of the microactuator 340 to contact beam along its axis. Such motion brings arm 352 into contact with contacts 366 and 368 to close the circuit between the contracts, thus providing an extremely small, light weight electrical switch.

Although the present invention has been described in terms of preferred embodiments, it will be apparent that numerous modifications and variations can be made without departing from the true spirit and scope thereof, as set forth in the following claims.

What is claimed is:

1. A precision microactuator for movable microstructures, comprising:
   a beam having a longitudinal axis and having a first fixed end and a second remote end;
   at least one pair of opposed capacitor plates in said beam and dividing said beam into relatively movable axially aligned, longitudinal segments; and
   means for applying a potential across said plates to cause said relatively movable segments to move with respect to each other to cause said remote end of said beam to move along said longitudinal axis with respect to said fixed end to vary the length of the beam.

2. The actuator of claim 1, wherein said at least one pair of capacitor plates comprises a plurality of spaced pairs of capacitor plates spaced along said beam and dividing said beam into a corresponding plurality of relatively movable longitudinal segments.

3. The actuator of claim 1, further including flexible spring bias means connected to said plates.

4. The actuator of claim 3, wherein said spring bias means comprises end spacer means between said plates.

5. The actuator of claim 3, wherein said spring bias means comprises connector means connected to said beam segments.

6. The actuator of claim 3, wherein said spring bias means comprises electrically insulating end spacer means between said plates.

7. The actuator of claim 3, wherein said spring bias means comprises electrically conductive connector means connected to said beam segments.

8. The actuator of claim 7, wherein said spring bias means further includes electrically insulating flexible end spacer means between said plates.

9. The actuator of claim 1, wherein said beam and capacitor plates form a cantilevered microstructure within a cavity formed in an integrated circuit wafer.

10. The actuator of claim 9, wherein said means for applying a potential across said plates includes electrically conductive connector means connected between selected beam segments and electrical circuit means on said wafer.

11. The actuator of claim 10, wherein said electrically conductive connector means comprises flexible connector arms which mechanically support and spring bias said microstructure.

12. The actuator of claim 9, wherein said at least one pair of capacitor plates comprises a plurality of pairs of capacitor plates spaced along said beam and dividing said beam into a corresponding plurality of relatively movable longitudinal segments.

13. The actuator of claim 12, wherein said means for applying a potential across said plates comprises electrically conductive connector means interconnecting selected beam segments.

14. The actuator of claim 12, wherein said means for applying a potential across said plates comprises electrically conductive connector means connected between selected beam segments and said wafer.

15. The actuator of claim 1 wherein said beam and capacitor plates are fabricated from a single-crystal electrically conductive substrate to form a cantilevered microstructure, the beam and capacitor plates being of the same material as the substrate.

16. The actuator of claim 15, further including a layer of electrically insulating material on selected surface of said capacitor plates.

17. The actuator of claim 16, further including flexible spring bias means fabricated from said electrically insulating material and connected between opposed capacitor plates for maintaining said plates in a predetermined spaced relationship.

18. The actuator of claim 17, further including electrically conductive connector means connected to corresponding segments of said beam, said connector means forming a part of said cantilevered microstructure.

19. The actuator of claim 18, wherein said connector means are fabricated from the same material as the substrate.

20. The actuator of claim 18, wherein said connector means are flexible and provide additional spring bias means for maintaining said plates in said predetermined spaced relationship.

21. The actuator of claim 15, wherein said substrate is single crystal silicon.

22. The actuator of claim 22, further including a layer of electrically insulating nitride on selected surfaces of said capacitor plates.

23. The actuator of claim 22, further including spring bias means fabricated from said electrically insulating nitride material and connected to bias said capacitor plates toward a predetermined spaced relationship.

24. The actuator of claim 23, further including flexible, electrically conductive connector means fabricated from said single crystal silicon substrate material and providing electrical connections to said capacitor plates.

25. The actuator of claim 1, further including:
   a plurality of beams each having a first fixed end and a second remote end and at least one pair of opposed capacitor plates in each of said beam to divide each beam into relatively movable, axially aligned, longitudinal segments, said second ends of said beams being connected to a common beam area; and
   means for applying potentials across selected pairs of opposed capacitor plates to vary the lengths of corresponding beams and to controllably move said common area.

26. The actuator of claim 25, wherein said plurality of beams extend radially outwardly in a common plane from said common area.

27. The actuator of claim 25, further including substrate means, said first fixed ends of said beams being mounted on said substrate and said common beam area being movable with respect to said substrate.

28. The actuator of claim 27, further including opposed upper and lower nanometer-scale tip means incorporated in said common area and on said substrate, respectively, in vertical axial alignment, movement of said common area moving said upper tip means with respect to said lower tip means.

29. The actuator of claim 27, further including switch means mounted on said common area and on said substrate, whereby motion of said common area operates said switch means.

30. The actuator of claim 27, wherein said means applying potentials across selected pairs of opposed capacitor plates includes integrated control circuit means on said substrate.

31. The actuator of claim 27 wherein said means applying potentials across selected pairs of opposed capacitor plates includes flexible electrically conductive connector means extending between said substrate and selected beam segments.

32. The actuator of claim 27, wherein said at least one pair of opposed capacitor plates in each beam comprises plural spaced pairs of capacitor plates spaced along each beam and dividing the beam into a corresponding plurality of relatively movable longitudinal segments.

33. The actuator of claim 32, further including flexible spring bias means urging each pair of capacitor plates toward a predetermined spaced relationship.

34. The actuator of claim 33, wherein said flexible spring bias means includes spacer means connected between opposed plates of each said pair of capacitor plates.

35. The actuator of claim 33, wherein said flexible spring bias means includes electrically conductive connector means connected to selected beam segments.

36. The actuator of claim 1, wherein said capacitor plates are electrically conductive opposed, generally concave plates having facing generally concave surfaces.

37. The actuator of claim 36, further including insulator means covering said facing surfaces, said insulator means extending beyond said plates at opposite ends thereof to form flexible spring-biased spacers for said capacitor plates.

38. The actuator of claim 1, further including first switch means secured on said remote end of said beam for relative motion with respect to a second switch means.

* * * * *

UNITED STATES PATENT AND TRADEMARK OFFICE
CERTIFICATE OF CORRECTION

PATENT NO. : 5,179,499

DATED : January 12, 1993

INVENTOR(S) : MacDonald et al

It is certified that error appears in the above-identified patent and that said Letters Patent is hereby corrected as shown below:

Claim 22, column 18, line 19, change "claim 22" to --claim 21--.

Signed and Sealed this

Sixteenth Day of November, 1993

Attest:

BRUCE LEHMAN

Attesting Officer   Commissioner of Patents and Trademarks

UNITED STATES PATENT AND TRADEMARK OFFICE
CERTIFICATE OF CORRECTION

PATENT NO.   :   5,179,499
DATED        :   January 12, 1993
INVENTOR(S)  :   Noel C. MacDonald It is certified that error appears in the above-identified patent and that said Letters Patent is hereby corrected as shown below:

Column 1, line 4, insert the following:

--This invention was made with Government support under Grant No. ECS-9212900, awarded by the National Science Foundation. The Government has certain rights in the invention.--

Signed and Sealed this

Seventh Day of March, 1995

*Attest:*

BRUCE LEHMAN

*Attesting Officer*     *Commissioner of Patents and Trademarks*